US007813776B2

(12) United States Patent
Lee et al.

(10) Patent No.: US 7,813,776 B2
(45) Date of Patent: Oct. 12, 2010

(54) DOUBLE SLIDING-TYPE PORTABLE COMMUNICATION APPARATUS

(75) Inventors: Yang-Jic Lee, Seoul (KR); Jong-Seong Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 405 days.

(21) Appl. No.: 11/005,415

(22) Filed: Dec. 6, 2004

(65) Prior Publication Data

US 2005/0255897 A1 Nov. 17, 2005

(30) Foreign Application Priority Data

Apr. 29, 2004 (KR) ...................... 10-2004-0030021

(51) Int. Cl.
*H04M 1/00* (2006.01)

(52) U.S. Cl. .............. 455/575.4; 455/550.1; 455/575.1; 455/90.3; 361/690; 361/697; 361/724; 361/727; 345/169; 257/207; 379/428.01

(58) Field of Classification Search ............. 455/575.4, 455/569.1, 575.1, 90.3, 556.1, 556.2, 550.1; 379/433.11, 433.12, 428.01; 361/697, 690–695, 361/679–687, 724–727; 345/169, 405; 257/207
See application file for complete search history.

(56) References Cited

U.S. PATENT DOCUMENTS

| 6,882,335 | B2 | | 4/2005 | Saarinen | |
|---|---|---|---|---|---|
| 6,961,593 | B1 | * | 11/2005 | Lonka et al. | 455/573 |
| 6,963,756 | B2 | * | 11/2005 | Lubowicki et al. | 455/550.1 |
| 6,973,186 | B2 | * | 12/2005 | Shin | 379/433.12 |
| 7,003,104 | B2 | * | 2/2006 | Lee | 379/433.13 |
| 7,081,947 | B2 | | 7/2006 | Gui et al. | |
| 7,084,345 | B1 | * | 8/2006 | Chen et al. | 174/545 |
| 7,091,957 | B2 | * | 8/2006 | Duarte et al. | 345/169 |
| 7,092,747 | B2 | * | 8/2006 | Park et al. | 455/575.4 |
| 7,107,018 | B2 | * | 9/2006 | Jellicoe | 455/90.3 |
| 7,142,420 | B2 | * | 11/2006 | Santos et al. | 361/679.57 |
| 7,162,283 | B2 | * | 1/2007 | Bae et al. | 455/575.4 |
| 2003/0064688 | A1 | * | 4/2003 | Mizuta et al. | 455/90 |
| 2005/0009581 | A1 | * | 1/2005 | Im et al. | 455/575.4 |
| 2005/0049019 | A1 | * | 3/2005 | Lee | 455/575.4 |
| 2005/0059438 | A1 | * | 3/2005 | Jellicoe | 455/575.1 |
| 2005/0070348 | A1 | * | 3/2005 | Lee et al. | 455/575.4 |

(Continued)

FOREIGN PATENT DOCUMENTS

DE 203 17 865 4/2004

(Continued)

*Primary Examiner*—Matthew D Anderson
*Assistant Examiner*—April G Gonzales
(74) *Attorney, Agent, or Firm*—The Farrell Law Firm, LLP

(57) ABSTRACT

A double sliding-type portable communication apparatus, in which one housing slidably moves relative to the other housing through double-sliding motions, which includes a main housing extending in a longitudinal axis and a sliding housing moving in said longitudinal and also lateral directions across the main housing whose upper surface faces away from the main housing to allow the sliding housing may become displaced away from the main housing and also slidably return to overlap the main housing, wherein said housings are aligned parallel to each other in the longitudinal axis or a lateral direction across the main housing to expose predetermined regions of an upper surface of the main housing with keys provided thereon.

15 Claims, 10 Drawing Sheets

U.S. PATENT DOCUMENTS

| | | | |
|---|---|---|---|
| 2005/0091431 A1* | 4/2005 | Olodort et al. | 710/72 |
| 2005/0095995 A1* | 5/2005 | Bae | 455/90.3 |
| 2005/0104856 A1* | 5/2005 | Jacobs et al. | 345/169 |
| 2005/0107137 A1* | 5/2005 | Byun et al. | 455/575.1 |
| 2005/0130720 A1* | 6/2005 | Finke-Anlauff | 455/575.3 |
| 2005/0221873 A1* | 10/2005 | Kameyama et al. | 455/575.4 |
| 2005/0255897 A1 | 11/2005 | Lee et al. | |
| 2006/0046796 A1* | 3/2006 | Park et al. | 455/575.4 |
| 2006/0063569 A1* | 3/2006 | Jacobs et al. | 455/575.1 |
| 2006/0063571 A1* | 3/2006 | Chadha | 455/575.3 |
| 2006/0135229 A1* | 6/2006 | Kwak et al. | 455/575.4 |
| 2006/0146014 A1* | 7/2006 | Lehtonen | 345/156 |
| 2006/0252471 A1* | 11/2006 | Pan | 455/575.4 |
| 2006/0293093 A1* | 12/2006 | Marcus | 455/575.3 |
| 2007/0049356 A1* | 3/2007 | Jung et al. | 455/575.1 |

FOREIGN PATENT DOCUMENTS

| | | |
|---|---|---|
| GB | 2 407 933 | 5/2005 |
| GB | 2407933 A * | 5/2005 |
| KR | 1020040105944 | 12/2004 |
| WO | WO 02/091149 | 11/2002 |
| WO | WO 03/050665 | 6/2003 |
| WO | WO 2004/049150 | 6/2004 |

* cited by examiner

DOUBLE SLIDING-TYPE PORTABLE COMMUNICATION APPARATUS

PRIORITY

This application claims priority to an application entitled "Double Sliding-Type Portable Communication Apparatus" filed with the Korean Intellectual Property Office on Apr. 29, 2004 and assigned Serial No. 2004-30021, the contents of which are hereby incorporated by reference.

BACKGROUND OF THE INVENTION

1. Field of the Invention

The present invention relates to double sliding-type portable communication apparatuses, such as cellular phones, PDAs (personal digital assistants), HHPs (hand held phones), and other communication apparatuses, and more particularly to a double sliding-type portable communication apparatus, in which one housing slidably moves relative to the other housing through double-sliding motions.

2. Description of the Related Art

In general, a "portable communication apparatus" refers to an electronic appliance allowing users to communicate with other users via wired or wireless communication devices while carrying portable terminals. For the sake of portability, designs of such portable communication apparatuses tend to be compact, slim, and light. Multimedia availability, is also a consideration, where having a wider variety of functions is desirable. In particular, future portable communication apparatuses are expected to incorporate greater multi-functionality and multi-purpose utilization, as well as being more compact and lighter, while being capable of accessing various multimedia environments or Internet environments. Additionally, such portable communication apparatuses are now commonly used throughout the world, and are recognized by some people as a nearly indispensable commodity, which must always be carried.

Conventional portable communication apparatuses may be classified into various types according to their appearance. For example, sliding type portable communication apparatuses are classified into bar-type communication apparatuses, flip-type portable communication apparatuses and folder-type portable communication apparatuses. The bar-type portable communication apparatus has a single housing shaped like a bar. The flip-type portable communication apparatus has a flip, which is pivotably mounted to a bar-shaped housing by a hinge unit. The folder-type portable communication apparatus has a folder coupled to a single bar-shaped housing by a hinge unit to allow rotation of the holder towards the housing to close it, or away from the housing to unfold it.

Further, portable communication apparatuses may be classified into rotation-type communication apparatuses and sliding-type communication apparatuses depending on the particular way the communication apparatus is opened. In the rotation-type portable communication apparatus, two housings are coupled to each other to allow one housing to rotate open or closed relative to the other while facing each other. In the sliding-type portable communication apparatus, two housings are coupled to each other to allow one housing to slide open or closed relative to the other. These variously classified portable communication apparatuses can be easily understood by those skilled in the art.

Meanwhile, conventional portable communication apparatuses currently transmit data at high speeds in their function of performing voice communication.

Currently, portable communication apparatuses are equipped with camera lenses, which enable each of the communication apparatuses to transmit an image signal. That is, current conventional portable communication apparatuses may have an embedded or external camera lens or a photographing unit, which enables a user to make an image communication with a desired partner or to take a photograph of a desired subject.

However, since the conventional sliding-type portable communication apparatus includes two housings, in which one housing slides in one direction relative to the other housing, the overall thickness of the sliding-type portable communication apparatus consequently increases two-fold with increasing thickness of two housings.

In addition, in the conventional sliding-type portable communication apparatus, one housing slides in an opposite direction relative to the other only exposing a fraction of the inner surface to the user, consequently resulting in less usable surface area where keys and a liquid crystal display maybe installed.

This is particularly inconvenient when playing a game or manipulating keys.

Korean Patent Application No. 2002-71911, which has been filed with the Korean Intellectual Property Office by the applicant of the present application (also filed in the U.S. Patent and Trademark Office as U.S. application Ser. No. 10/379,551), discloses a structure of a sliding-type portable communication apparatus in detail. However, the above sliding-type portable communication apparatus is somewhat bulky due to the result of combining the two housings together. Accordingly, desirability of the sliding-type portable communication apparatus of the prior art is limited.

SUMMARY OF THE INVENTION

Accordingly, the present invention has been made to solve the above-mentioned problems occurring in the prior art, and an object of the present invention is to provide a double sliding-type portable communication apparatus, in which one housing slidably moves relative to the other housing through double-sliding motions to allow thickness of a portable communication terminal to be minimized, thereby resulting in a slim portable communication terminal.

Another object of the present invention is to provide a double sliding-type portable communication apparatus, in which one housing slidably moves relative to the other housing through double-sliding motions allowing greater usable area of the inner surface of the housing, thereby allowing greater surface area with which more keys and a larger display unit may be mounted on.

Still another object of the present invention is to provide a double sliding-type portable communication apparatus, allowing users to conveniently manipulate a plurality of keys with both hands to manipulate the keys or play a game.

In order to accomplish the above objects, there is provided a double sliding-type portable communication apparatus comprising a main housing extending in a longitudinal direction and a sliding housing moving lengthwise and widthwise along the main housing while facing the main housing such that the sliding housing becomes distant from the main housing or closely comes to the main housing, and aligned in parallel the main housing in a longitudinal direction or a transverse direction of the main housing so as to expose predetermined regions of an upper surface of the main housing to an exterior.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
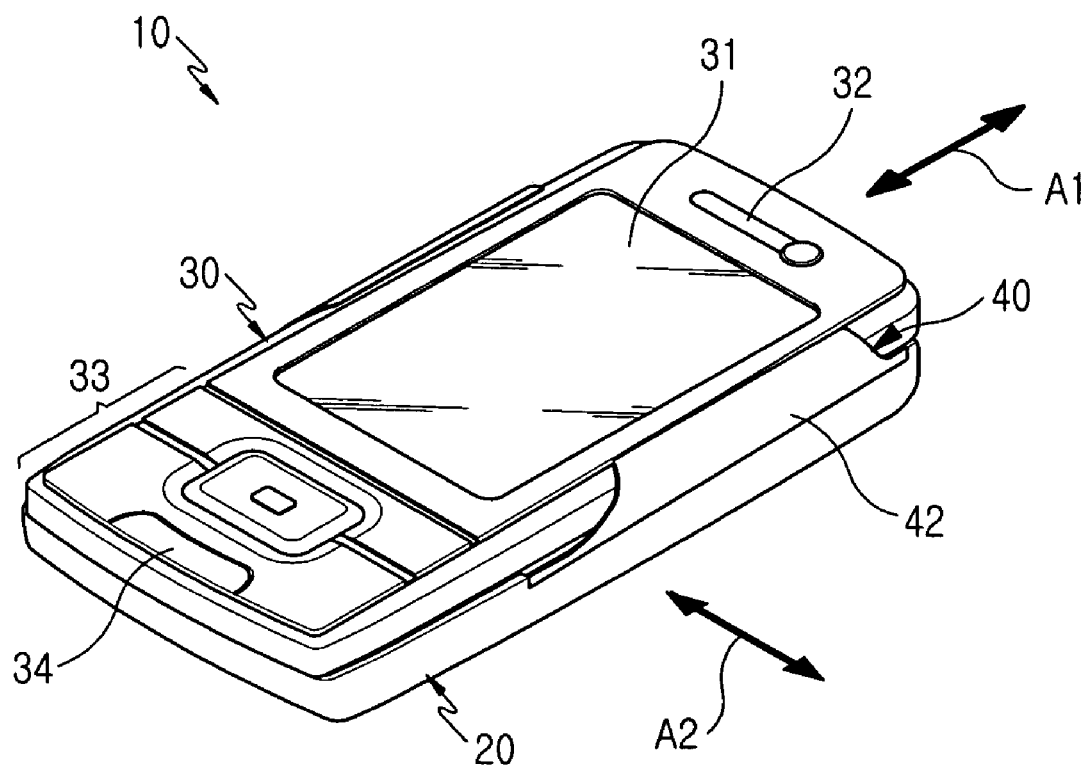
FIG. 1 is a perspective view of a double sliding-type portable communication apparatus according to a first embodiment of the present invention.

Hereinafter, preferred embodiments of the present invention will be described with reference to the accompanying drawings. In the following description of the preferred embodiment of the present invention, a detailed description of known functions and configurations incorporated herein will be omitted when it may make the subject matter of the present invention unclear. In the drawings, the same or similar reference numbers will be used throughout to refer to the same or like parts.

As shown in FIGS. 1 to 10, a double sliding-type portable communication apparatus 10 according to the present invention includes a main housing 20, a sliding housing 30, and a double sliding member 40. The main housing 20 has provided at an upper surface thereof first and second regions 21 and 22.

The first region 21 is recessed a predetermined depth along a first sliding direction A1 to allow a lower portion of the double sliding member 40 to be accommodated in the first region 21. The second region 22 is positioned adjacent to the first region 21 and protrudes from a lower portion of the first region 21 to provide for a second key array 27 in the second region 22.

The sliding housing 30 moves in the first sliding direction A1 lengthwise along the longitudinal direction of main housing 20 and parallel to the main housing 20 whose upper surface faces away from the main housing 20 to allow the sliding housing 30 to become displaced from or substantially overlap the main housing 20. As the sliding housing 30 moves in the first sliding direction A1 and the second sliding direction A2, which is perpendicular to the first sliding direction A1, the first and second regions 21 and 22 formed on the upper surface of the main housing 20 may be either exposed or covered by the sliding housing 30. Preferably, the first region 21 is larger in area than the second region 22. The sliding housing 30 moves slidingly in the first and second sliding directions A1 and A2.

The double sliding member 40 is provided between the main housing 20 and the sliding housing 30 so as to guide the sliding movement of the sliding housing 30 in the first and second sliding directions A1 and A2, and also to hold the sliding housing 30 in place.

A guide groove 25 is formed in the first region 21 in order to allow the sliding housing 30 to be laterally displaced from the main housing 20 in the second sliding direction A2.

The guide groove 25 is formed at upper and lower ends thereof with first and second stepped guide portions 23 and 24, respectively. The first and second stepped guide portions 23 and 24 extend widthwise with respect to the longitudinal direction along the main housing 20 having predetermined heights. The sliding housing 30 moves slidingly along the first and second stepped guide portions 23 and 24.

The first and second regions 21 and 22 are provided with first and second key arrays 26 and 27, respectively. The first and second key arrays 26 and 27 include a plurality of keys 26a and 27a, which maybe either exposed to or covered depending on the sliding movement of the sliding housing 30. The number of keys 26a of the first key array 26 is preferably larger than the number of keys 27a of the second key array 27.

Figure 6:
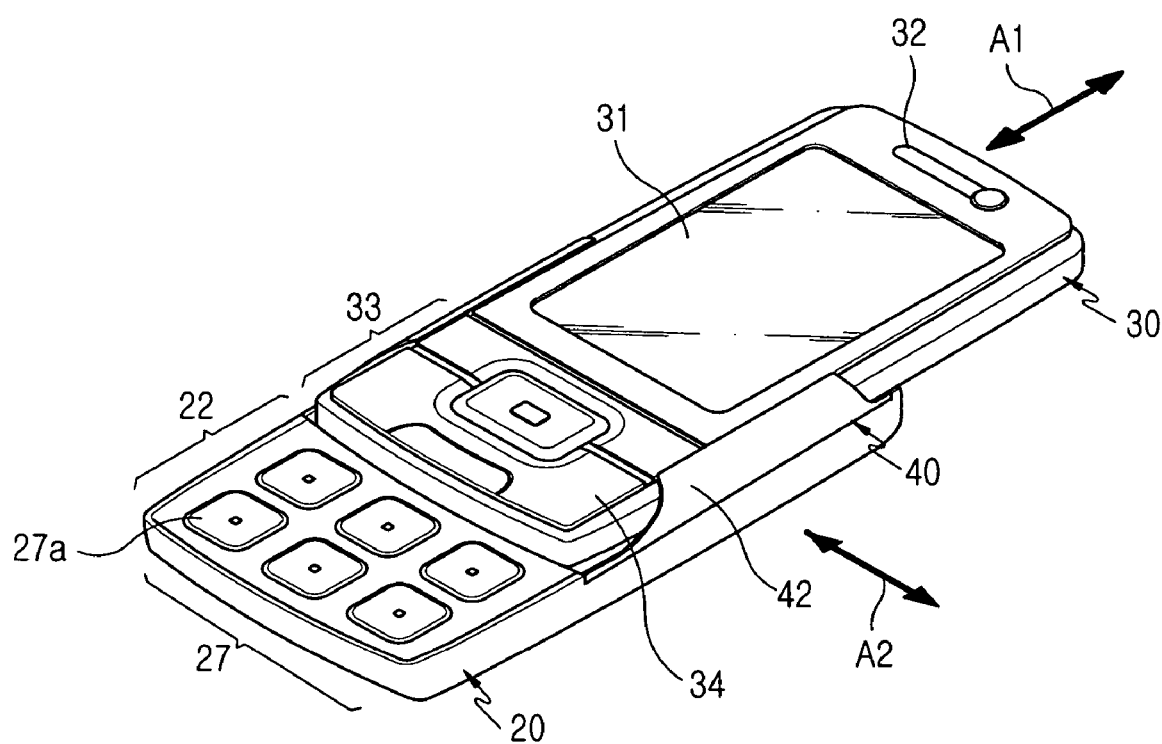
FIG. 6 is a perspective view showing a double sliding-type portable communication apparatus according to the first embodiment of the present invention, in which a sliding housing has been moved lengthwise along a main housing.
Figure 8:
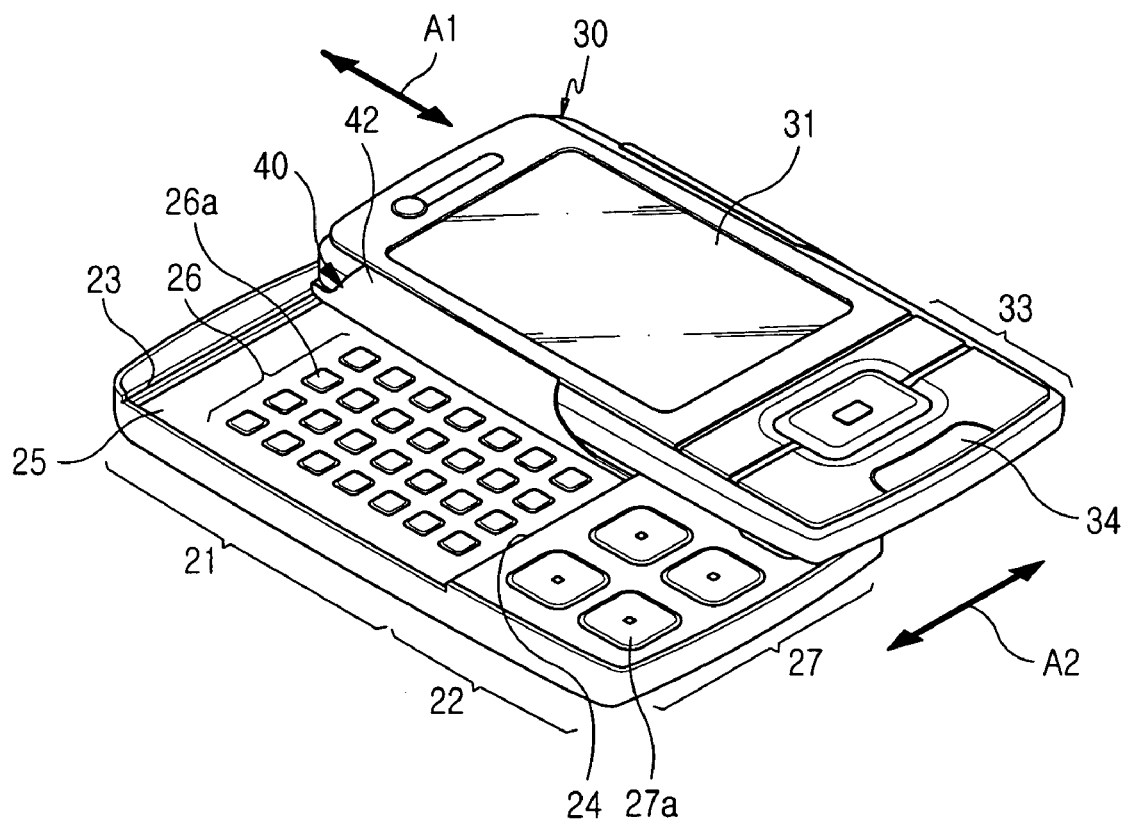
FIG. 8 is a perspective view showing a double sliding-type portable communication apparatus according to the first embodiment of the present invention, in which a sliding housing has been laterally displaced away from a main housing.

The second key array 27 is exposed to the exterior when the sliding housing 30 is displaced away from the main housing 20 in the first sliding direction A1, as seen in FIG. 6. In addition, the first and second key arrays 26 and 27 are both exposed when the sliding housing 30 moves sequentially in the first and second sliding directions A1 and A2 remote from the main housing 20, or when the sliding housing 30 is moved in the second sliding direction A2, as shown in FIG. 8.

The sliding housing 30 preferably has provided at an upper surface thereof a large-sized liquid crystal display unit 31, and a first speaker unit 32 is installed adjacent to the large-sized liquid crystal display unit 31. A third key array 33 having a plurality of keys 34 is aligned adjacent to the large-sized liquid crystal display unit 31.

Figure 9:
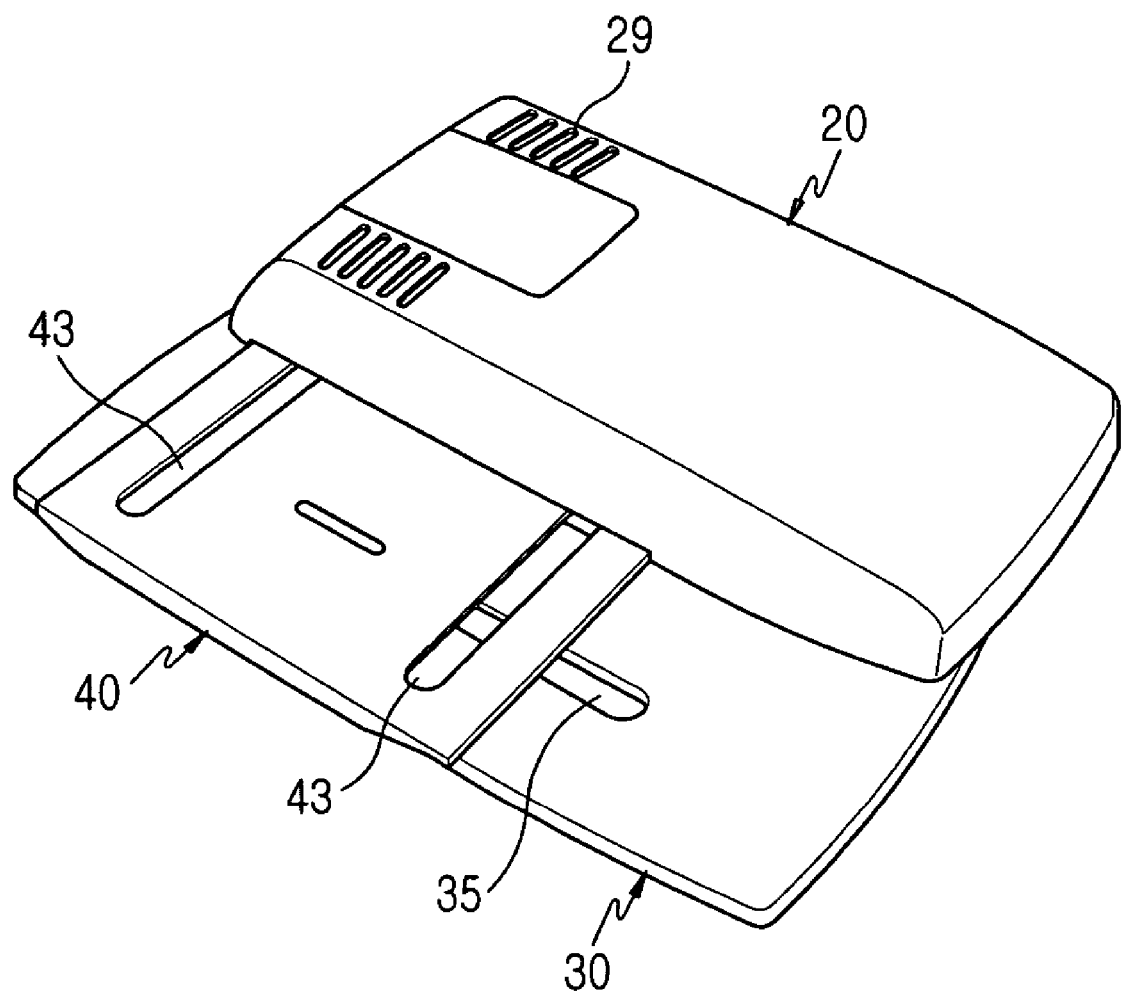
FIG. 9 is a bottom view of a double sliding-type portable communication apparatus shown in FIG. 7.

In addition, a second speaker unit 29 is installed on a bottom surface of the main housing 20, as shown in FIG. 9. The second speaker unit 29 includes a stereo speaker unit.

The sliding housing 30 is formed with a pair of first rail holes 35, into which guide protrusions 44 of the double sliding member 40 are inserted in order to guide the sliding movement of the sliding housing 30 in the first sliding direction A1. The first rail holes 35 have predetermined lengths for limiting the movement of the sliding housing 30.

The double sliding member 40 includes a body 41, a pair of guide holding sections 42 and a pair of second rail holes 43.

The body 41 is accommodated in the guide groove 25 of the main housing 20 to allow that the body 41 to slidably move over the first region 21.

The pair of guide holding sections 42 are provided at both sides of the body 41 and formed lengthwise along the sliding housing 30 for guiding the sliding movement of the sliding housing 30 in the first sliding direction A1 or for holding the sliding housing 30. The pair of second rail holes 43 are formed in the body 41 laterally to the main housing 20, and perpendicular to the longitudinal axis. Guide protrusions 28 of the main housing 20 provided in the first region 21 are inserted into the second rail holes 43 for guiding the sliding movement of the sliding housing 30 in the second sliding direction A2. The second rail holes 43 have predetermined lengths for limiting the movement of the sliding housing 30 in the second sliding direction A2.

In addition, the guide protrusions 28 of the main housing 20 are formed in a predetermined portion of the first region 21 in such a manner that the guide protrusions 28 are inserted into the second rail holes 43 of the double sliding member 40 and moved along the second rail holes 43 when the sliding housing 30 slidably moves in the second sliding direction A2.

A pair of guide protrusions 44 are formed in the double sliding member 40 to allow the guide protrusions 44 to be inserted into the first rail holes 35 of the sliding housing 30 and slidably displaced within the first rail holes 35 in the first sliding direction A1.

In addition, a pair of fixing sections 45 are formed in a predetermined portion of the double sliding member 40 so as to fixedly receive the guide protrusions 44 of the double sliding member 40.

Hereinafter, an operation of the double sliding-type portable communication apparatus having the above construction according to the preferred embodiment of the present invention will be described in detail with reference to FIGS. 1 to 10.

As shown in FIG. 1, the double sliding-type portable communication apparatus 10 includes the main housing 20, the sliding housing 30, and the double sliding member 40.

As shown in FIG. 8, the first region 21 recessed by a predetermined depth is formed in a direction parallel to the main housing 20 along the longitudinal axis and the second region 22 protrudes a predetermined height above and adjacent to the first region 21.

As shown in FIG. 1, the sliding housing 30 moves in the first and second sliding directions A1 and A2 whose upper surface faces away from the main housing 20 to allow the sliding housing 30 to become displaced from or substantially overlap the main housing 20. As the sliding housing 30 moves in the first and second sliding directions A1 and A2, the first and second regions 21 and 22 formed on the upper surface of the main housing 20 may either be exposed or covered by the sliding housing 30.

Figure 2:
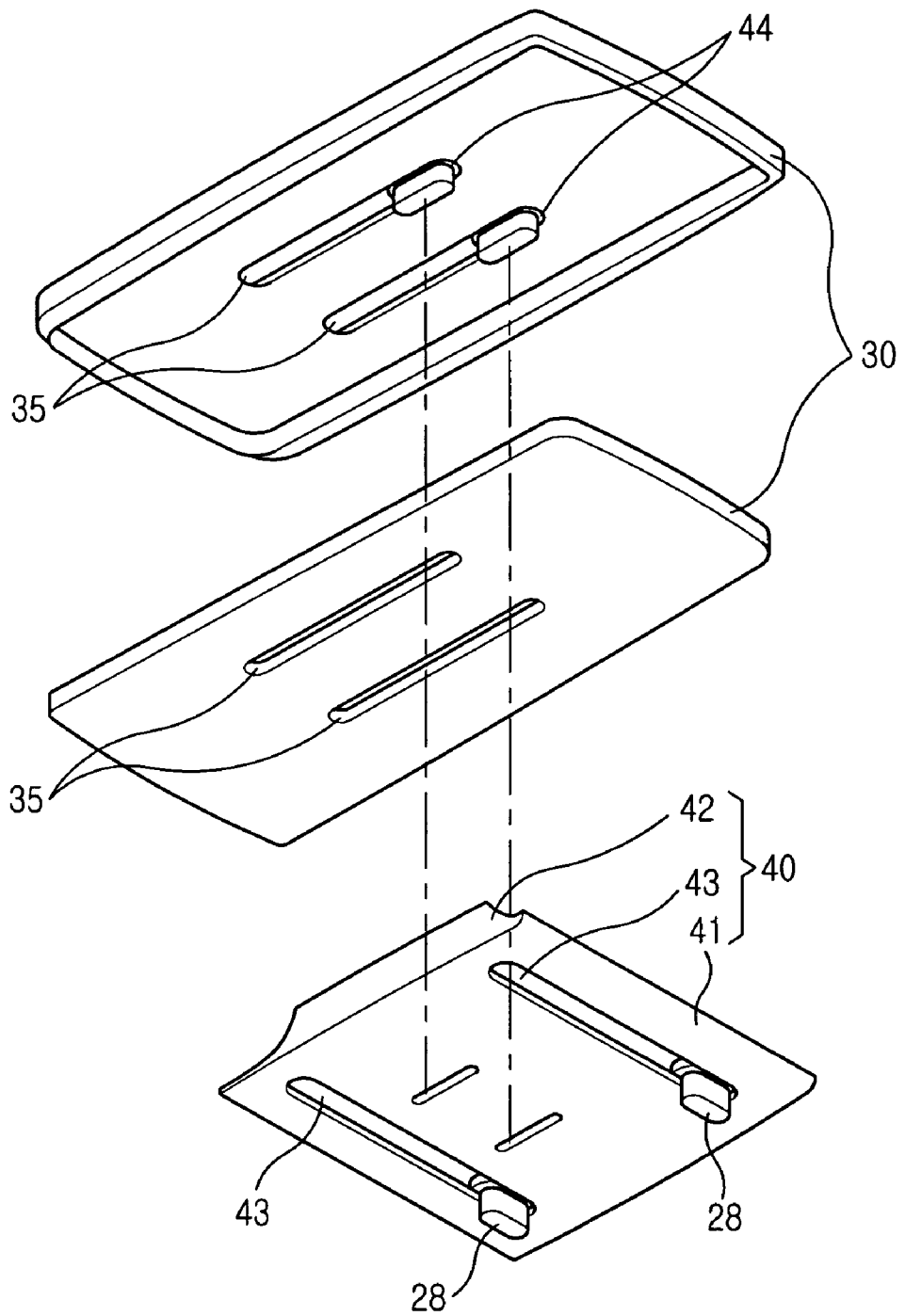
FIG. 2 is an exploded perspective view of a sliding housing and a double sliding member for a double sliding-type portable communication apparatus according to the first embodiment of the present invention.
Figure 3:
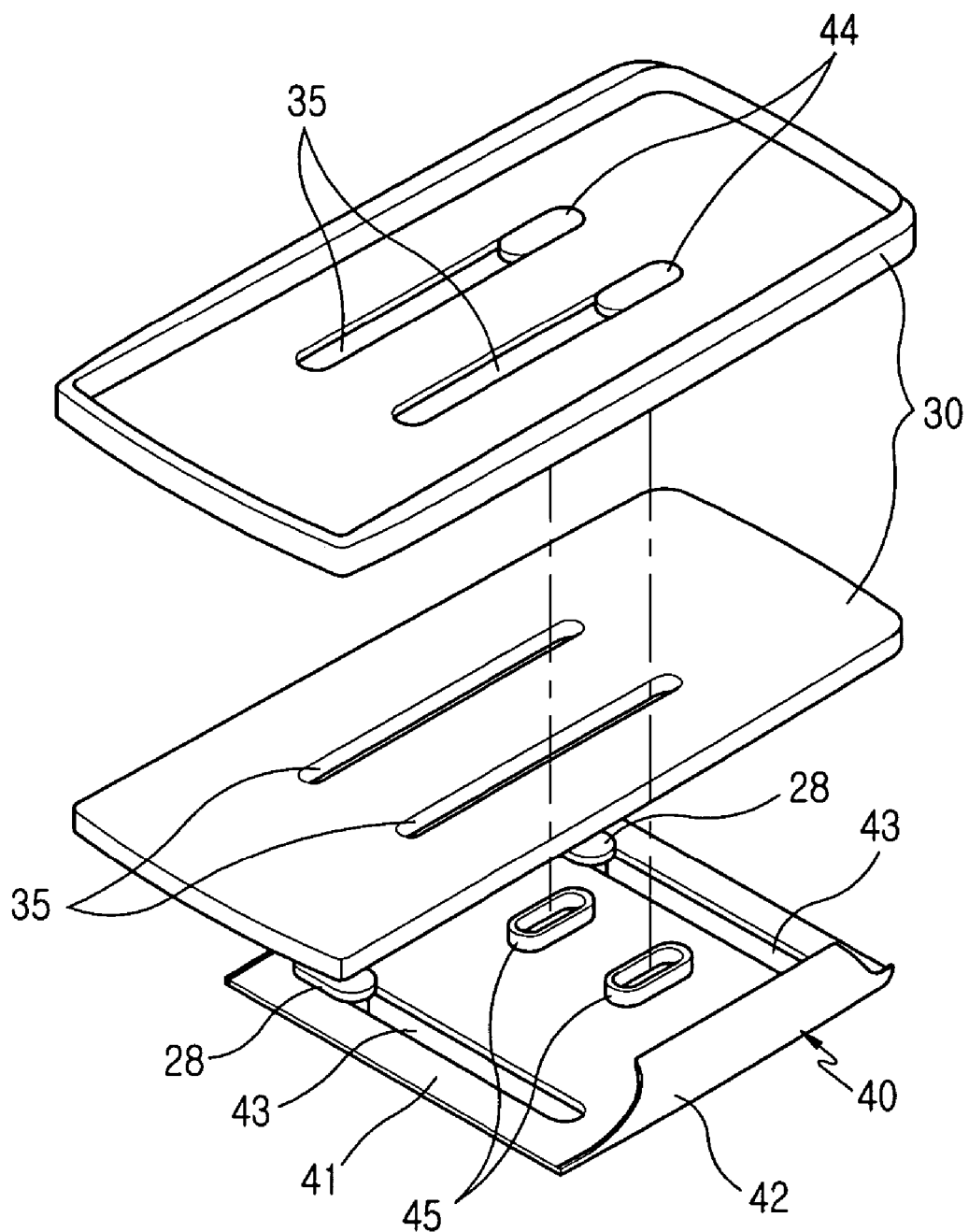
FIG. 3 is an exploded perspective view showing rear portions of a sliding housing and a double sliding member for a double sliding-type portable communication apparatus according to the first embodiment of the present invention.

Referring to FIGS. 2 and 3, the double sliding member 40 is provided between the main housing 20 and the sliding housing 30 to guide the sliding movement of the sliding housing 30 in the first and second sliding directions A1 and A2, and also to support the sliding housing 30.

In this state, as shown in FIG. 6, the sliding housing 30 is slidably displaced from the main housing 20 lengthwise along the longitudinal axis while guided by the guide holding sections 42 formed at both sides of the double sliding member 40. At this time, the second key array 27 provided in the main housing 20 is exposed, as seen in FIG. 6. As shown in FIG. 6, the second key array 27 includes a plurality of keys 27a, allowing a user to perform various functions of the portable terminal.

Figure 4:
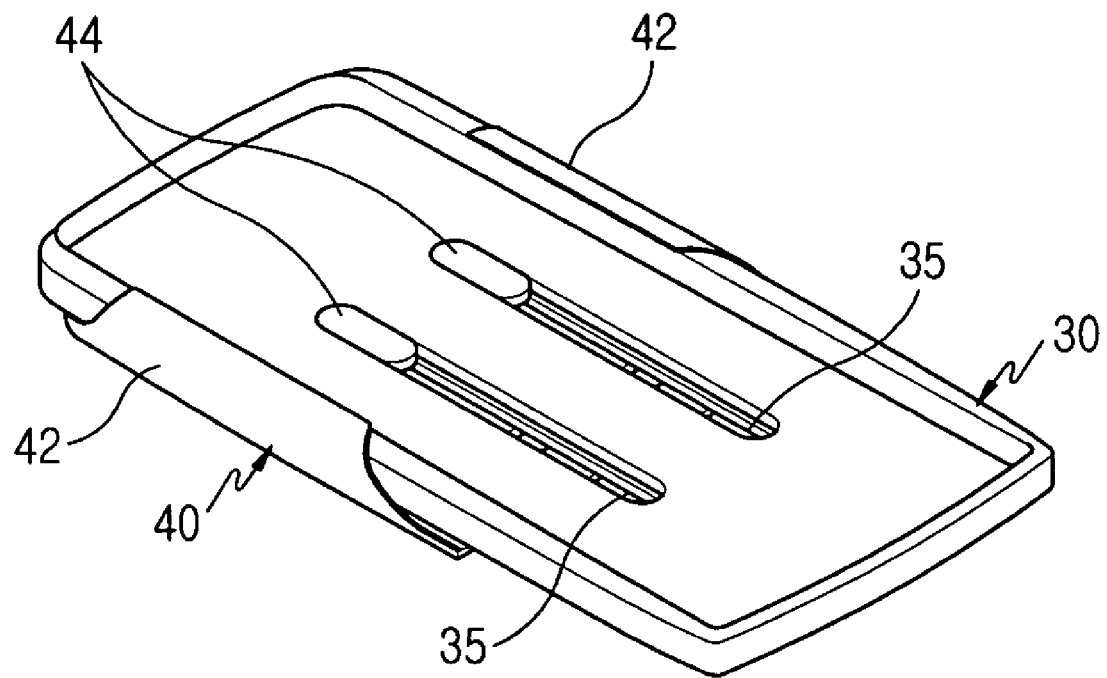
FIG. 4 is a perspective view showing a sliding housing-double sliding member assembly for a double sliding-type portable communication apparatus according to the first embodiment of the present invention.
Figure 5:
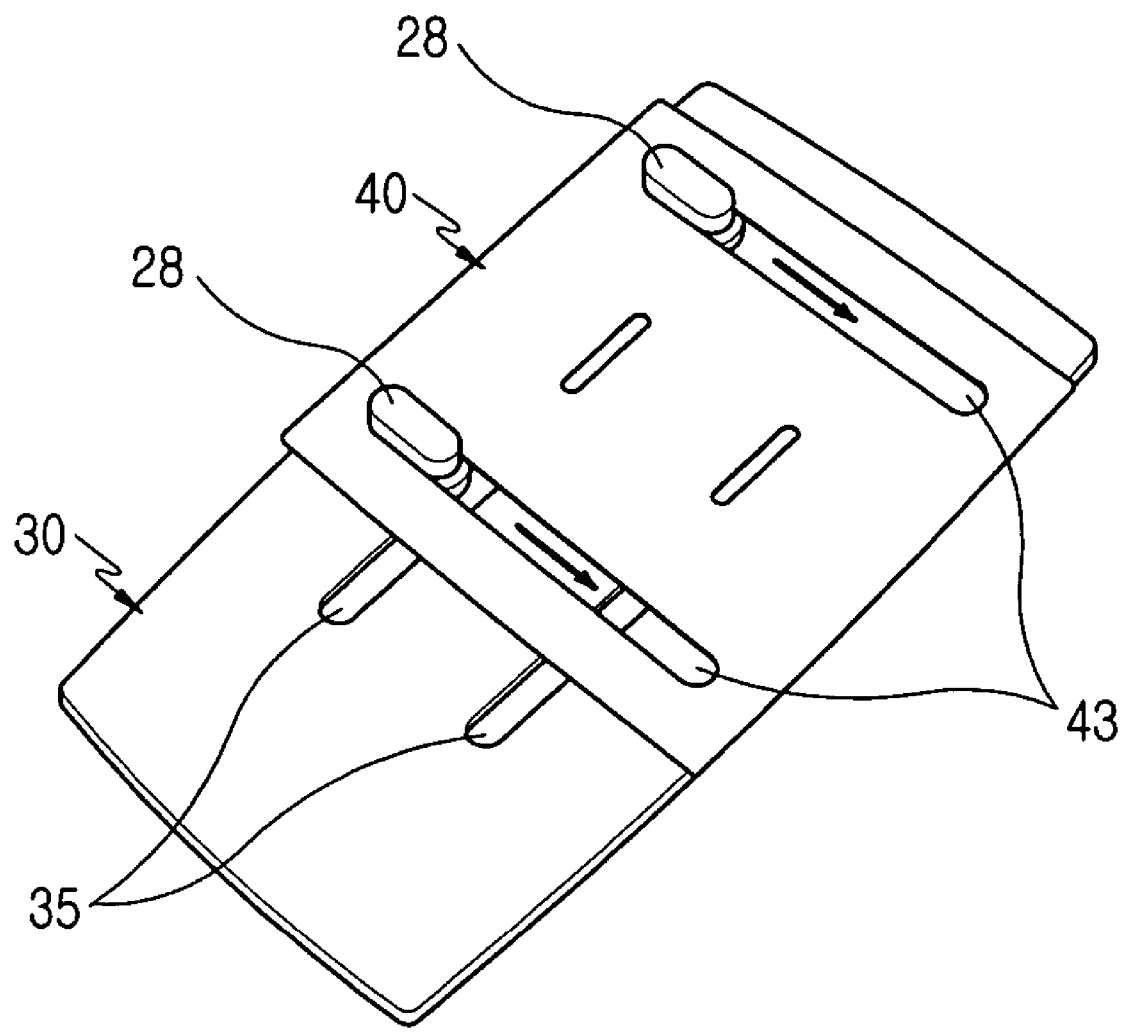
FIG. 5 is a perspective view showing a rear portion of a sliding housing-double sliding member assembly for a double sliding-type portable communication apparatus according to the first embodiment of the present invention.
Figure 7:
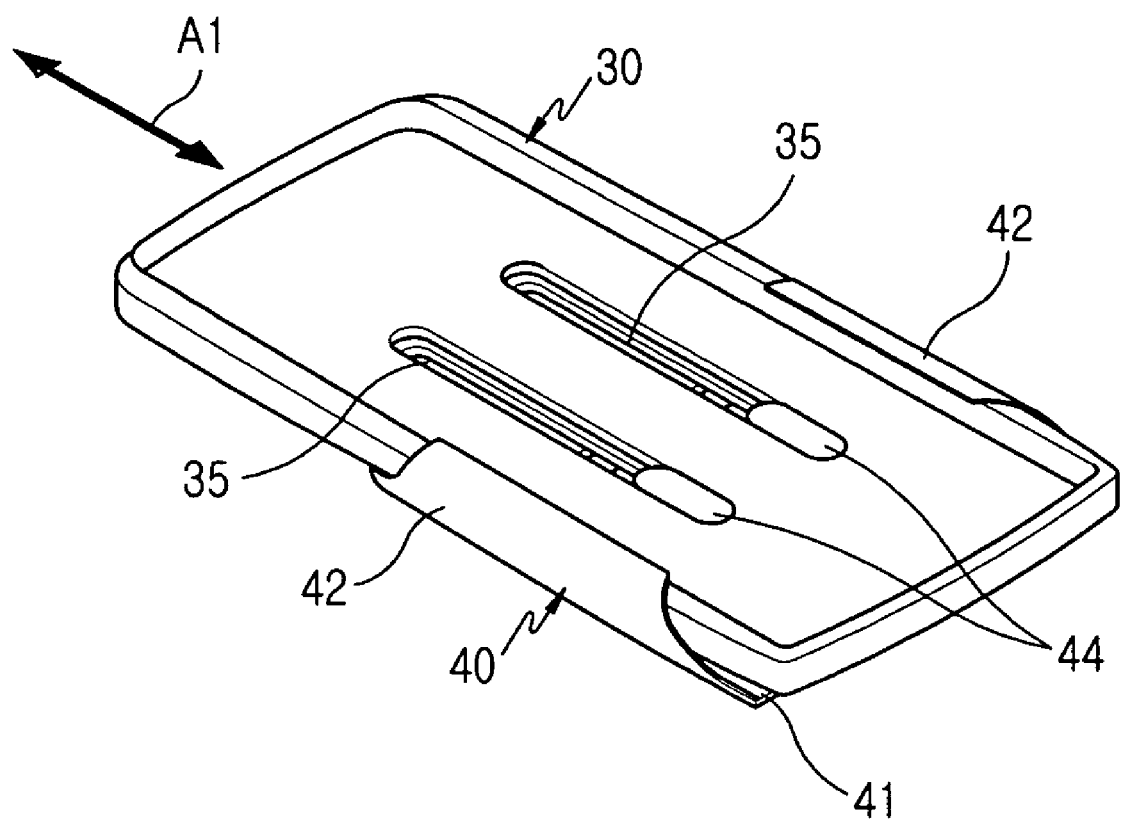
FIG. 7 is a perspective view showing a sliding housing-double sliding member assembly for a double sliding-type portable communication apparatus according to the first embodiment of the present invention, in which a sliding housing has been moved lengthwise along a main housing.

As shown in FIGS. 4 and 5, the pair of first rail holes 35, into which the guide protrusions 44 of the double sliding member 40 are inserted, are formed in the sliding housing 30 to guide the sliding movement of the sliding housing 30 in the first sliding direction A1, to allow the sliding housing 30 to stably move in the first sliding direction A1 with the guide protrusions 44 sliding within the first rail holes 35. As shown in FIG. 7, the first rail holes 35 have predetermined lengths for limiting the sliding movement of the sliding housing 30 in the first sliding direction A1.

Herein, the sliding housing 30 can be returned to its initial position as shown in FIG. 1 by slidably displacing the sliding housing 30 allowing the sliding housing 30 to substantially overlap the main housing 20.

In this state, as shown in FIGS. 8 and 9, if a user wishes to use various functions of the portable terminal, such as games, the user slidably moves the sliding housing 30 in the second sliding direction A2 displacing the sliding housing 30 laterally away from the main housing 20.

Accordingly, as shown in FIG. 8, the double sliding member 40 accommodated in the first region 21 is slidably moved laterally across the main housing 20 together with the sliding housing 30 along the guide groove 25 formed in the first region 21, in a direction perpendicular to the longitudinal axis.

Figure 10:
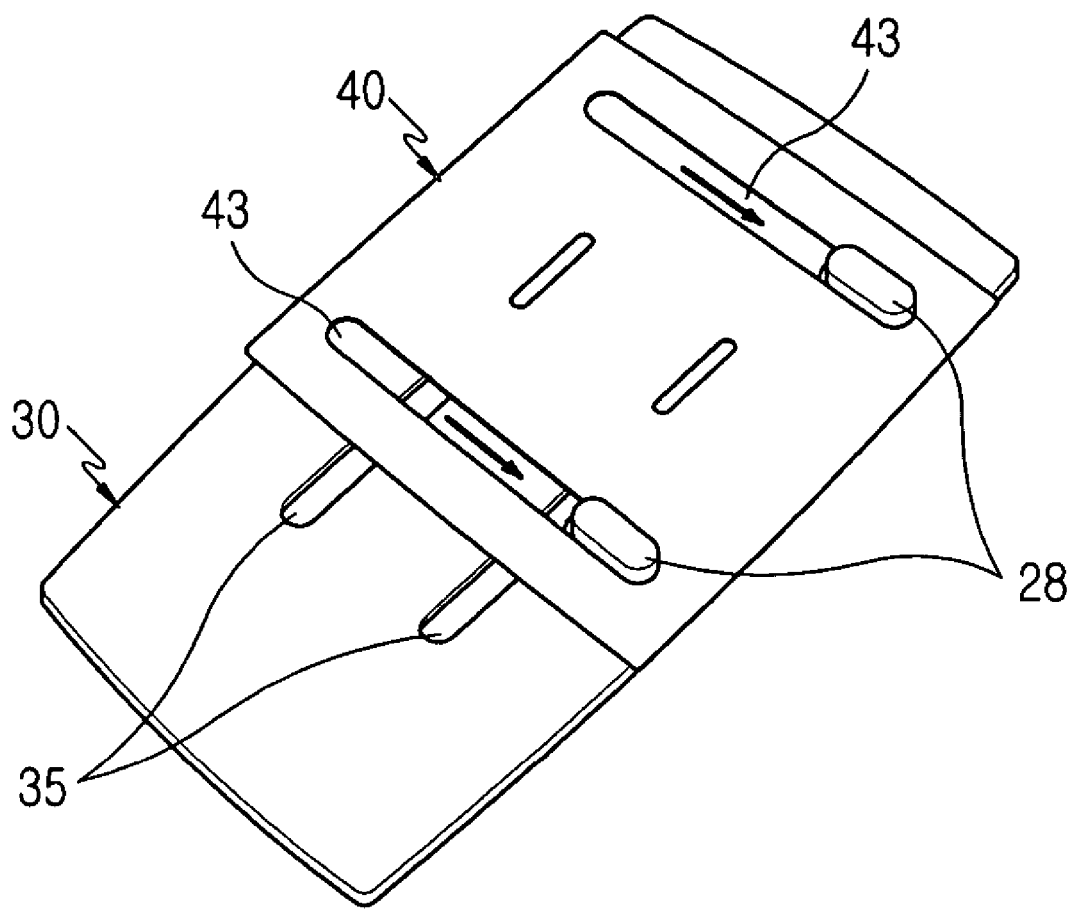
FIG. 10 is a perspective view showing a sliding housing-double sliding member assembly for a double sliding-type portable communication apparatus according to the first embodiment of the present invention, in which the sliding housing has been moved lengthwise along a main housing.

At this time, as shown in FIGS. 8 to 10, the sliding housing 30 is aligned in a plane parallel to the main housing 20 so that the first and second regions 21 and 22 formed on the upper surface of the main housing 20 are exposed.

As shown in FIGS. 8 and 9, since the guide groove 25 is formed at upper and lower ends of the first region 21 of the main housing 20 with first and second stepped guide portions 23 and 24 extending laterally along the main housing 20 with respect to the longitudinal axis and having predetermined heights, upper and lower ends of the body 41 of the double sliding member 40 are guided by the first and second stepped guide portions 23 and 24.

As shown in FIG. 10, the pair of second rail holes 43 are formed in the body 41 in a lateral direction of the main housing 20. The second rail holes 43 are coupled with guide protrusions 28 of the main housing 20 provided in the first region 21 so as to guide the sliding movement of the sliding housing 30 in the second sliding direction A2. Thus, the guide protrusions 28 of the main housing 20 move within the second rail holes 43 of the double sliding member 40 when the double sliding member 40 moves the sliding housing 30 in the second sliding direction A2. The second rail holes 43 have predetermined lengths for limiting the movement of the sliding housing 30 in the second sliding direction A2.

At this time, as shown in FIG. 8, the first and second regions 21 and 22 of the main housing 20 are exposed together with the first and second key arrays 26 and 27 provided thereon, respectively.

As mentioned above, the number of keys 26a of the first key array 26 is preferably greater than the number of keys 27a of the second key array 27, so that the user can conveniently perform use various functions and games by utilizing various keys provided in the portable terminal. That is, the user can operate the keys 26a and 27a provided in the first and second regions 21 and 22 with both hands.

As mentioned above, the sliding housing 30 has provided at the upper surface thereof with the first speaker unit 32 and the large-sized liquid crystal display unit 31 aligned adjacent to the first speaker unit 32. In addition, the third key array 33 having a plurality of keys 34 is aligned adjacent to the large-sized liquid crystal display unit 31. The third key array 33 is aligned on the upper surface of the sliding housing 30 to allow the third key array 33 to always be exposed.

Herein, the sliding housing 30 can be returned to its initial position as shown in FIG. 1 by slidably moving the sliding housing 30 in the second sliding direction A2 to allow the sliding housing 30 to substantially overlap the main housing 20.

As described above, the sliding housing of the portable terminal can be displaced from the main housing in the first and second sliding directions to allow the sliding housing to become aligned in parallel to the main housing, making it possible to fabricate a slim portable terminal having a relatively large usable area. Accordingly, a plurality of keys and a large-sized liquid crystal display unit can be provided in the portable terminal, so the user can conveniently operate the keys with both hands when performing functions or playing games.

While the invention has been shown and described with reference to certain preferred embodiments thereof, it will be understood by those skilled in the art that various changes in form and details may be made therein without departing from the spirit and scope of the invention as defined by the appended claims. For example, the present invention may be adaptable for various portable terminals.

What is claimed is:

1. A double sliding-type portable communication apparatus comprising:
   a main housing including a first key array having a plurality of first keys aligned on first region of an upper surface of the main housing, a second key array aligned on a second region of the upper surface of the main housing, positioned adjacent to the first key array and having a plurality of second keys, and stepped guide portions formed at upper and lower ends of the first region;
   a sliding housing including a display unit; and
   a double sliding member provided between the main housing and the sliding housing, the double sliding member guiding the sliding housing to open and close only the second key array by sliding along a longitudinal axis while facing the main housing, and guiding, in conjunction with the stepped guide portions, the sliding housing to open and close the first array and at least a portion of the second key array by sliding in a latitudinal direction perpendicular to the longitudinal axis,
   wherein a longitudinal dimension of the double sliding member facing with the main housing is smaller than a corresponding dimension of the upper surface of the main housing so that when the sliding housing is moved lengthwise, the second key array is exposed or covered, and when the sliding housing is moved widthwise, the first key array and a portion of the second key array are exposed or covered.

2. The double sliding-type portable communication apparatus as claimed in claim 1, wherein the sliding housing is linearly displaceable parallel and perpendicular to the longitudinal axis.

3. The double sliding-type portable communication apparatus as claimed in claim 1, wherein the double sliding member provides means for sliding the sliding housing and also for supporting the sliding housing.

4. The double sliding-type portable communication apparatus as claimed in claim 1, wherein the first region is recessed a predetermined depth, and the second region protruding by a predetermined height from the first region.

5. The double sliding-type portable communication apparatus as claimed in claim 4, wherein a guide groove is formed in the first region in order to guide a sliding movement of the sliding housing in a lateral direction of the main housing and the first and second stepped guide portions are formed at upper and lower ends of the guide groove laterally across the main housing having predetermined heights.

6. The double sliding-type portable communication apparatus as claimed in claim 4, wherein the first and second stepped guide portions are linearly formed.

7. The double sliding-type portable communication apparatus as claimed in claim 4, wherein the first region is greater in area than the second region.

8. The double sliding-type portable communication apparatus as claimed in claim 7, wherein the first key array is aligned in the first region, the second key array is aligned in the second region, and a number of the keys of the first key array is greater than a number of keys of the second key array.

9. The double sliding-type portable communication apparatus as claimed in claim 1, wherein the sliding housing has provided at the upper surface a speaker unit, a large-sized liquid crystal display unit positioned adjacent to the speaker unit, and a key array including a plurality of keys aligned adjacent to the large-sized liquid crystal display unit.

10. The double sliding-type portable communication apparatus as claimed in claim 1, wherein the main housing is provided at a bottom surface thereof with a speaker unit including a stereo speaker unit.

11. The double sliding-type portable communication apparatus as claimed in claim 3, wherein the sliding housing is formed at a bottom surface thereof with a pair of first rail holes, which are coupled with guide protrusions of the double sliding member in order to guide the sliding housing to slide over the main housing along the longitudinal axis of the main housing.

12. The double sliding-type portable communication apparatus as claimed in claim 11, wherein the double sliding member includes a body slidably provided in the first region, a pair of guide holding sections formed at both sides of the body lengthwise along the sliding housing in order to guide the sliding housing when the sliding housing moves from the main housing along the longitudinal axis and also to support the sliding housing, and a pair of second rail holes formed through the body in a lateral direction of the main housing and coupled with guide protrusions of the main housing provided in a predetermined portion of the first region providing a guide for the sliding housing when the sliding housing moves across the main housing laterally along the main housing.

13. The double sliding-type portable communication apparatus as claimed in claim 12, wherein the first and second rail holes have respective predetermined lengths for limiting the sliding movement of the sliding housing.

14. The double sliding-type portable communication apparatus as claimed in claim 3, wherein a pair of first guide protrusions are provided in a predetermined portion of the first region in such a manner that the first guide protrusions are coupled with second rail holes formed in the double sliding member and moved along the second rail holes when the sliding housing moves from the main housing widthwise along the main housing, and a pair of second guide protrusions are provided in an inner portion of the double sliding member to allow the second guide protrusions to be coupled with first rail holes formed in the sliding housing and slidingly movable within the first rail holes when the sliding housing is moved away from the main housing along the longitudinal axis of the main housing.

15. The double sliding-type portable communication apparatus as claimed in claim 3, further comprising a pair of fixing sections provided at an inner portion of the double sliding member to be fixedly coupled with guide protrusions of the double sliding member.

* * * * *